March 17, 1970 A. VAN DER LELY 3,501,059
IMPLEMENTS FOR TRANSPORTING MATERIALS
Filed May 1, 1968 12 Sheets-Sheet 1

INVENTOR
ARY VAN DER LELY
BY
Mason, Mason & Allright
Attorneys

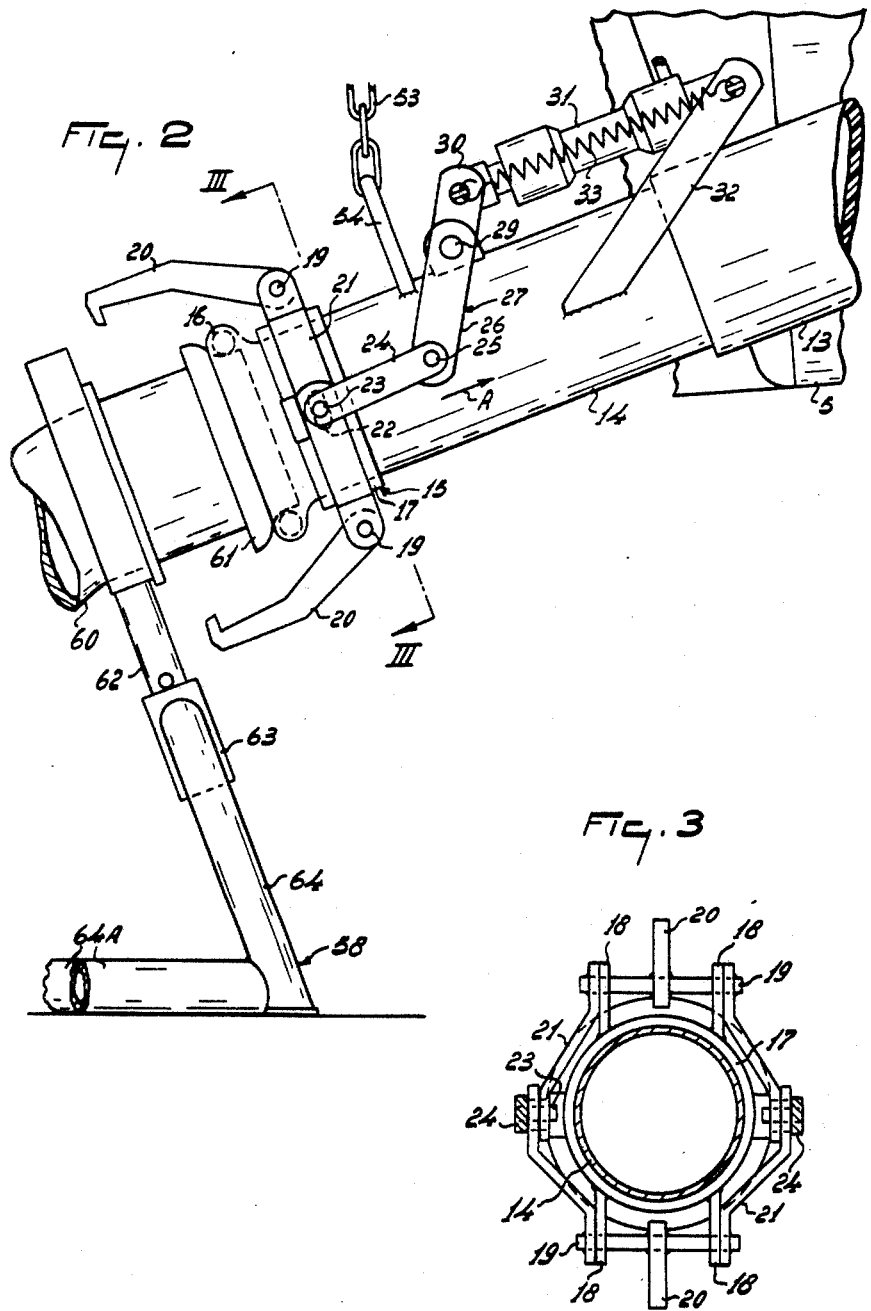

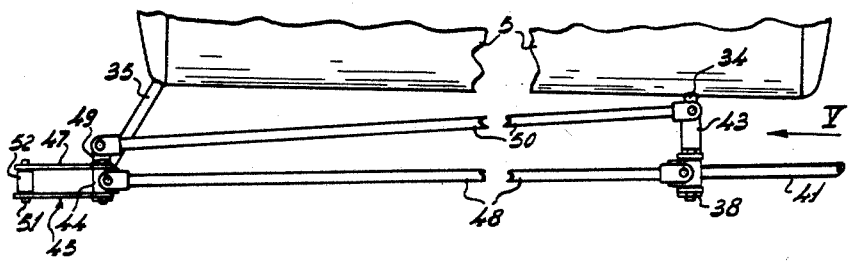
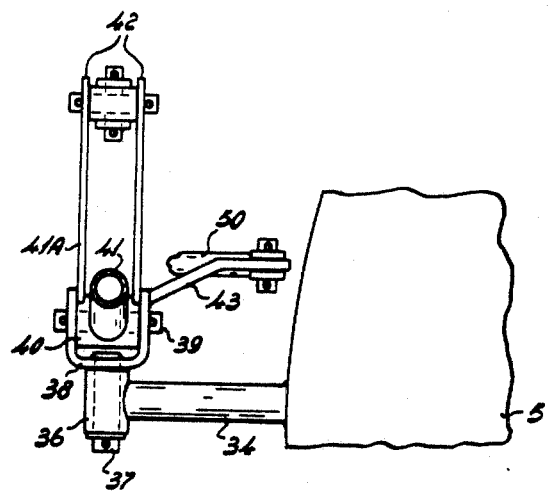
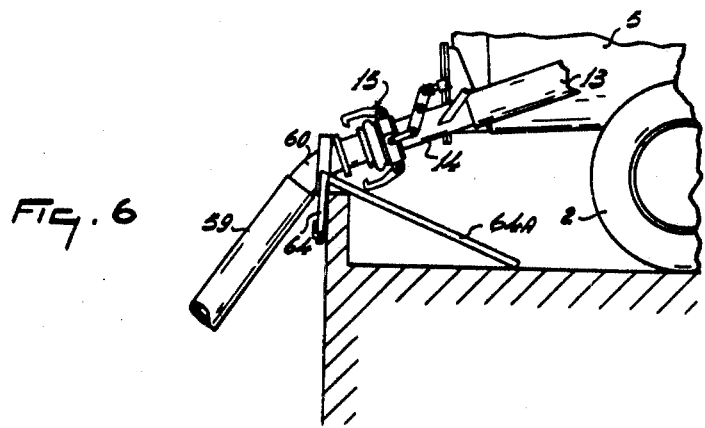

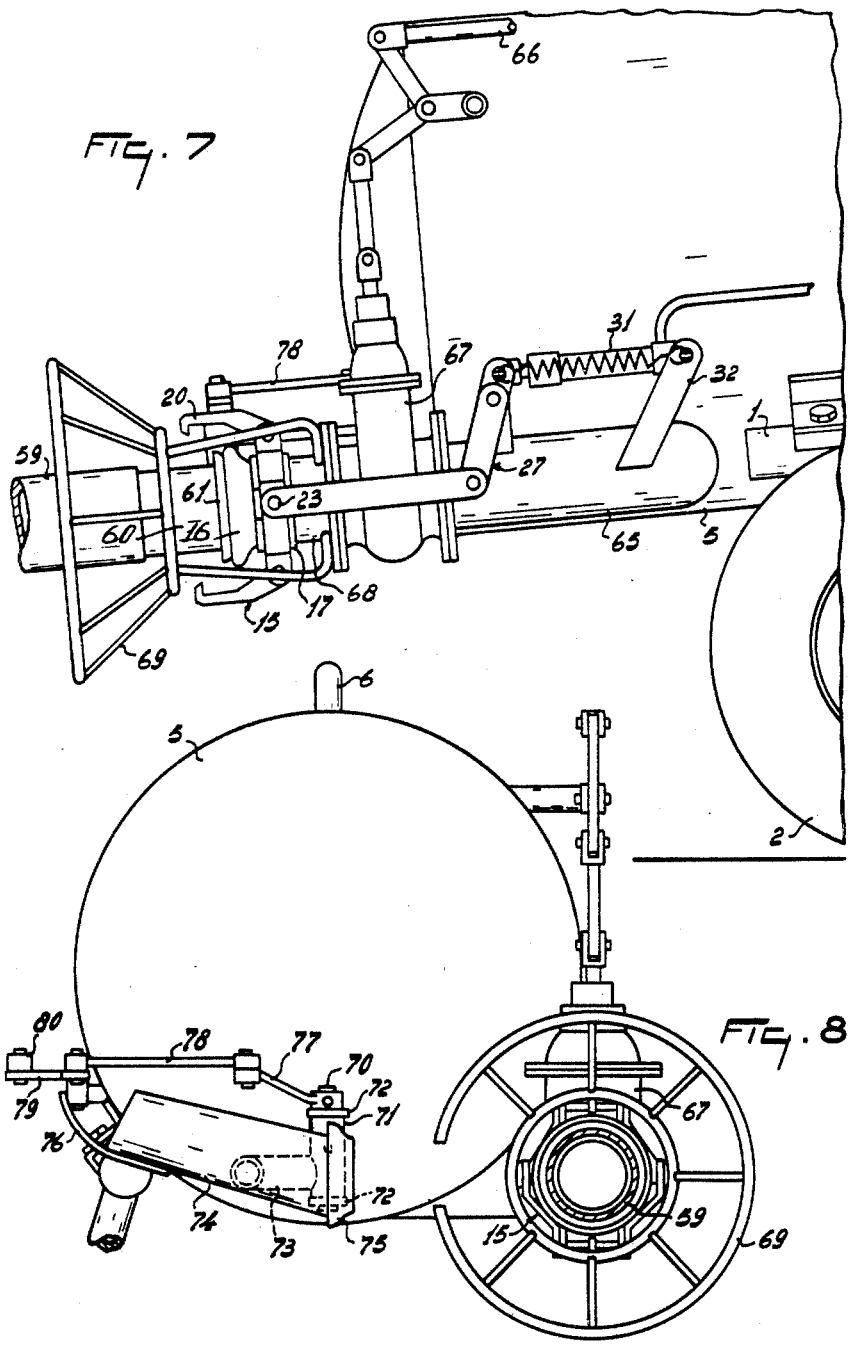

March 17, 1970 A. VAN DER LELY 3,501,059
IMPLEMENTS FOR TRANSPORTING MATERIALS
Filed May 1, 1968 12 Sheets-Sheet 5

INVENTOR
ARY VAN DER LELY
BY
Mason, Mason & Albright
Attorneys

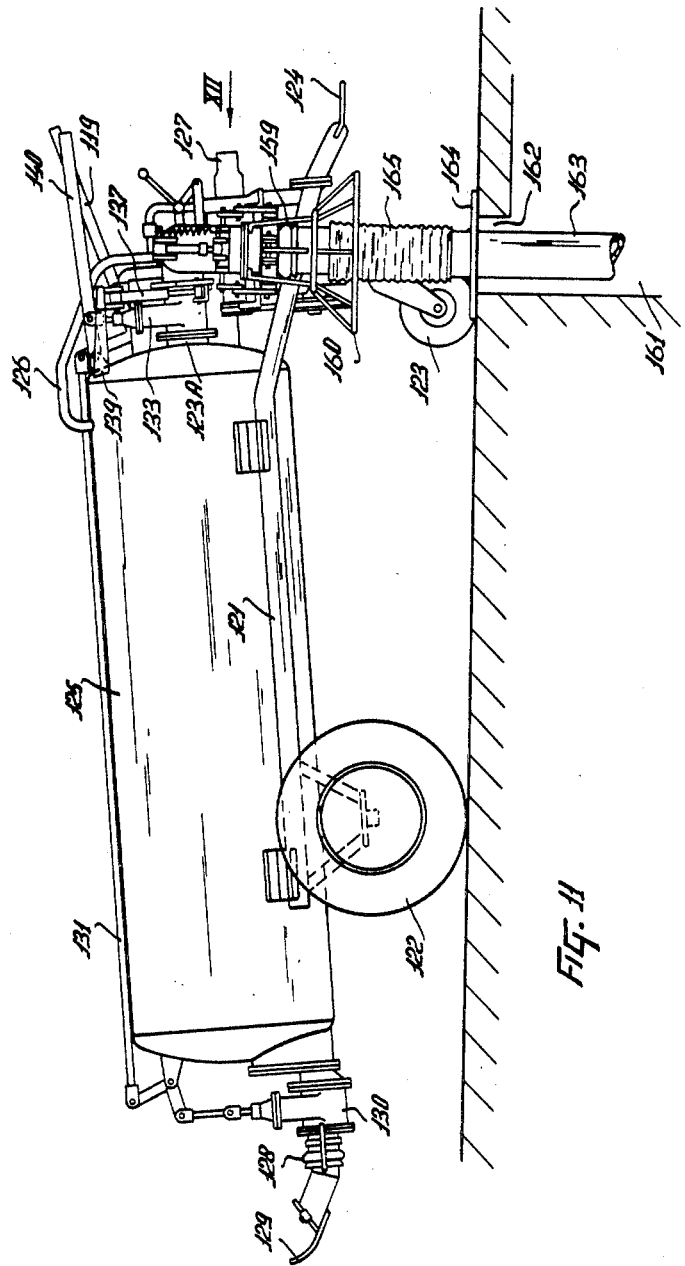

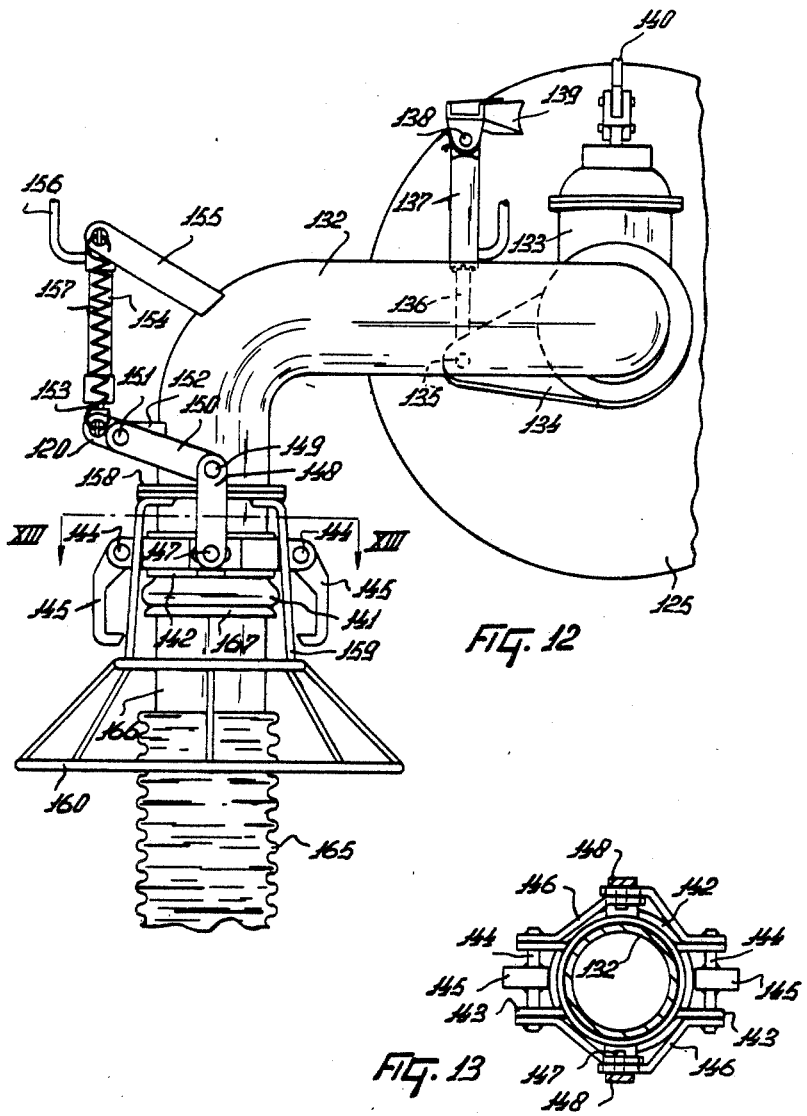

March 17, 1970   A. VAN DER LELY   3,501,059
IMPLEMENTS FOR TRANSPORTING MATERIALS
Filed May 1, 1968   12 Sheets-Sheet 9
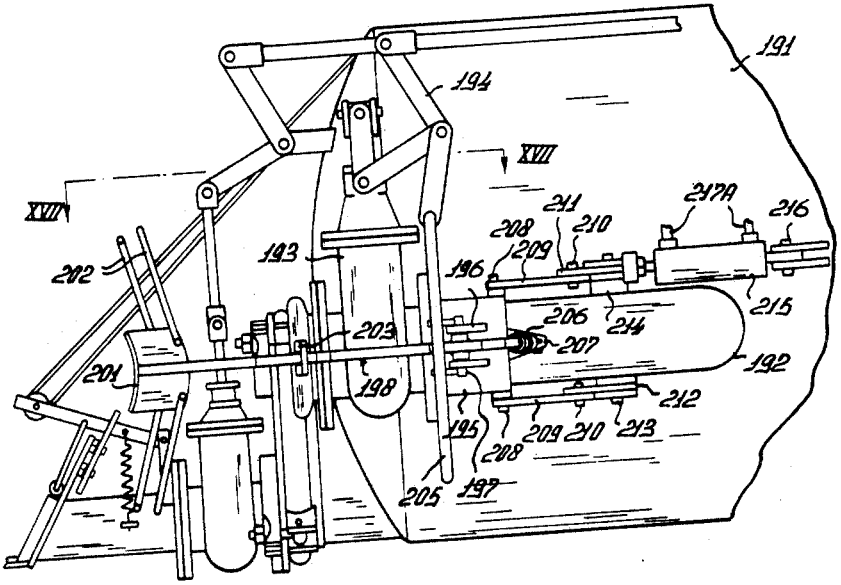
FIG. 16
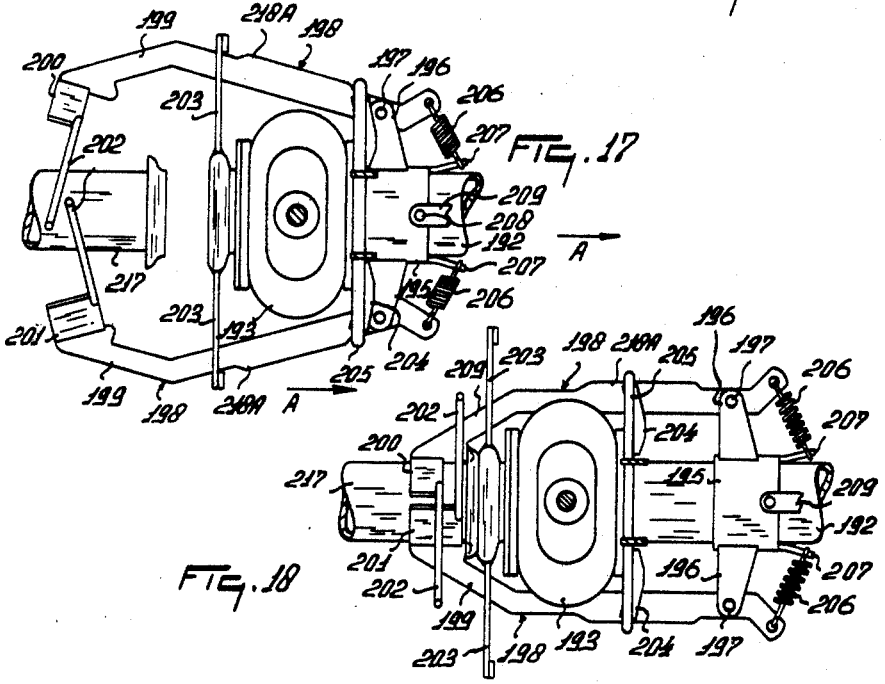
FIG. 17
FIG. 18
INVENTOR
ARY VAN DER LELY
BY
Mason, Mason & Albright
Attorneys INVENTOR
ARY VAN DER LELY
BY
Mason, Mason & Albright
Attorneys March 17, 1970 A. VAN DER LELY 3,501,059
IMPLEMENTS FOR TRANSPORTING MATERIALS
Filed May 1, 1968 12 Sheets-Sheet 11
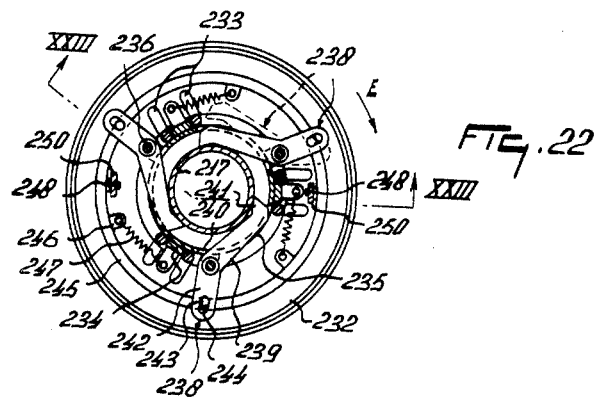
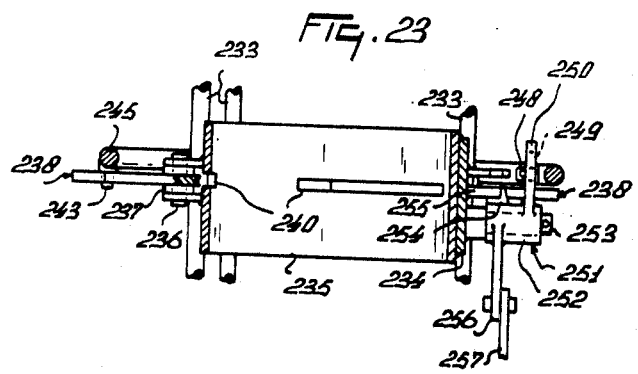
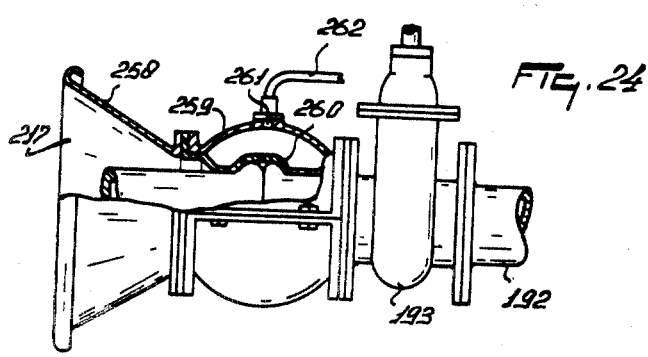
INVENTOR
ARY VAN DER LELY
BY
Mason, Mason & Albright
Attorneys

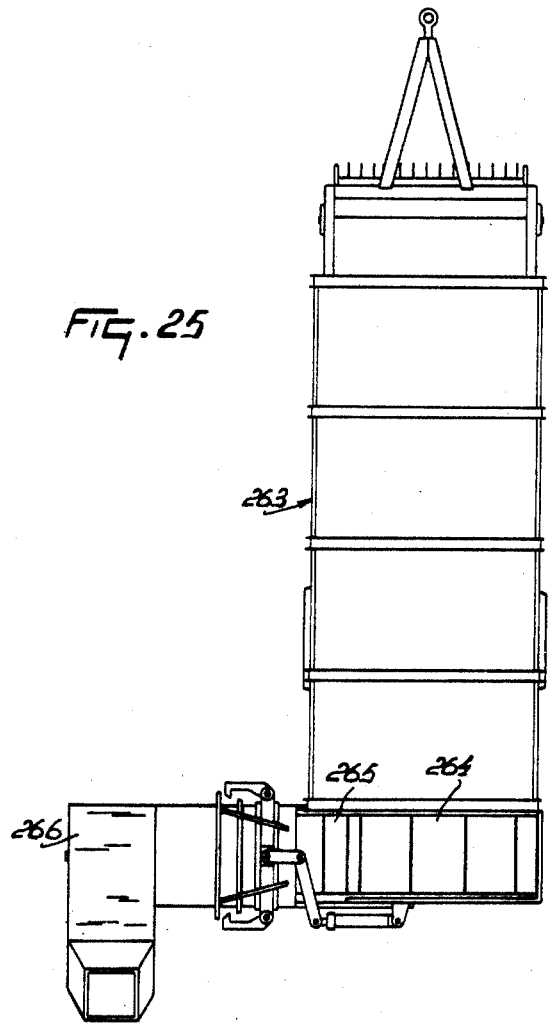

United States Patent Office 3,501,059
Patented Mar. 17, 1970

3,501,059
IMPLEMENTS FOR TRANSPORTING MATERIALS
Ary van der Lely, 10 Weverskade,
Maasland, Netherlands
Filed May 1, 1968, Ser. No. 725,631
Claims priority, application Netherlands, May 5, 1967, 6706287; June 12, 1967, 6708120; Nov. 9, 1967, 6715180
Int. Cl. A01c *15/00;* B67d *5/64*
U.S. Cl. 222—176                   26 Claims

ABSTRACT OF THE DISCLOSURE

This invention relates to implements for transporting materials, such implements comprising a mobile container provided with a port for the loading or discharging of the material.

A duct can be connected to the port through a coupling member and the latter can be remotely controlled.

---

Figure 1:
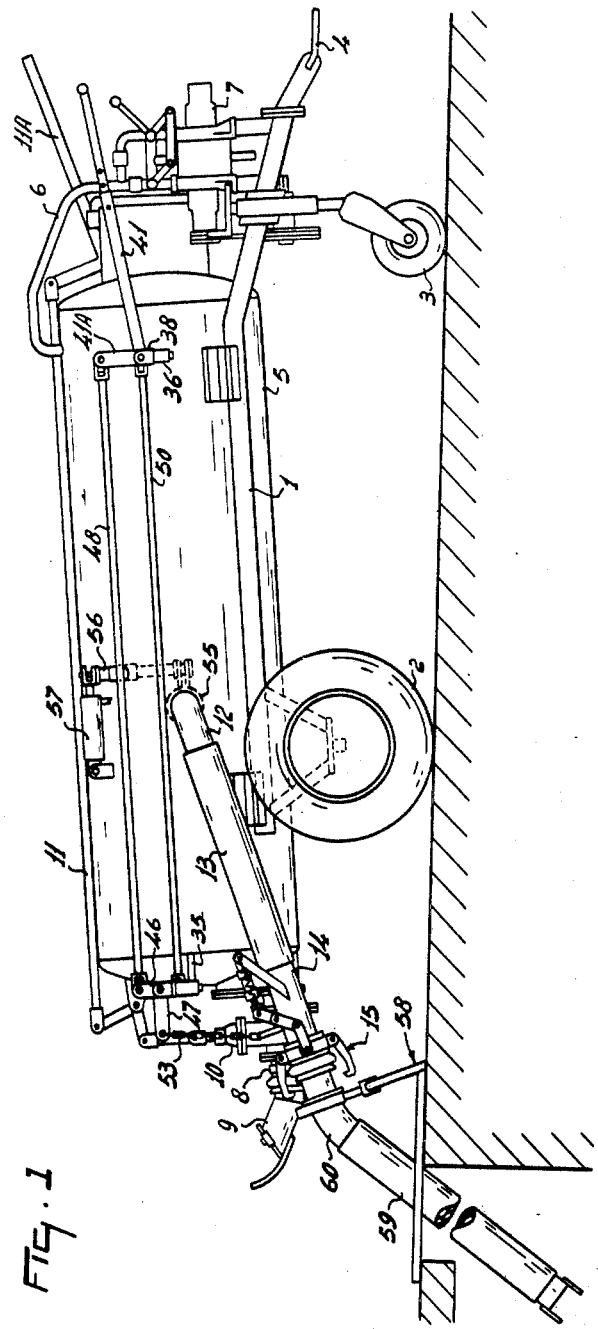
Figure 9:
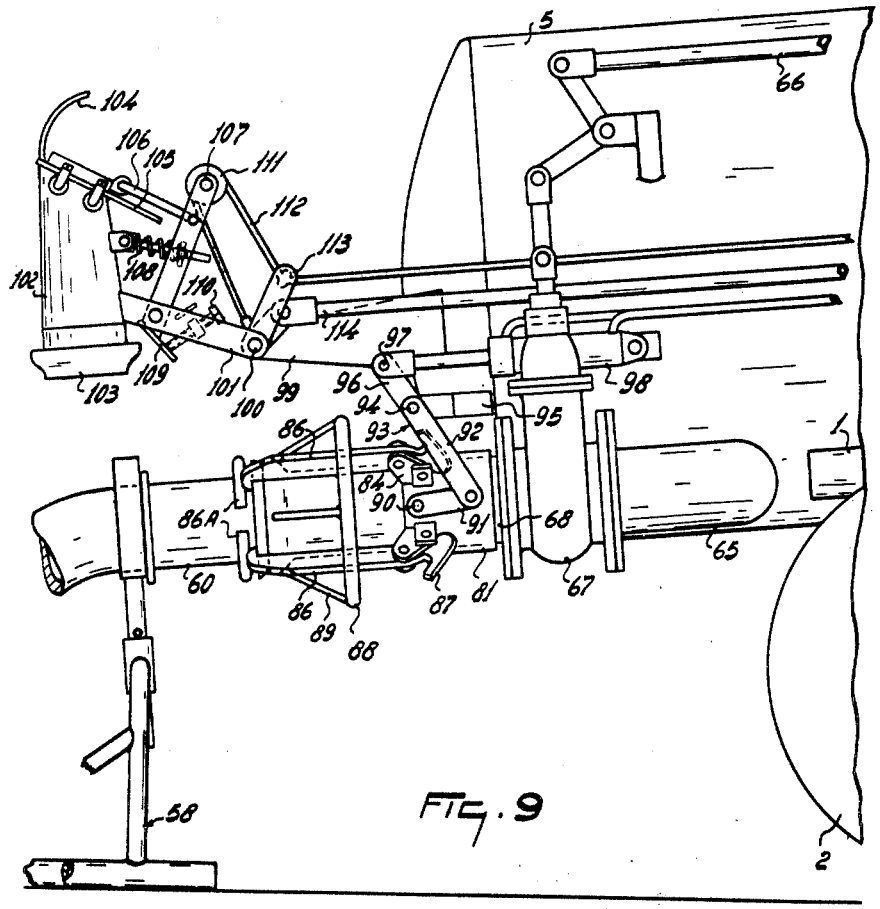
Figure 10:
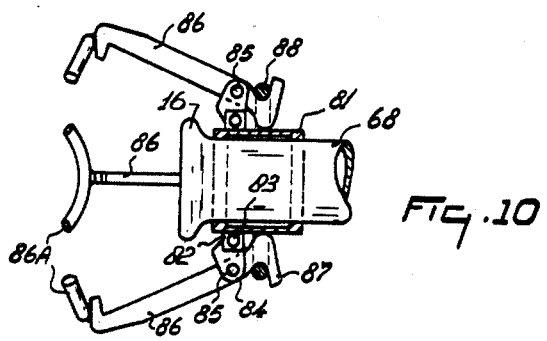
Figure 19:
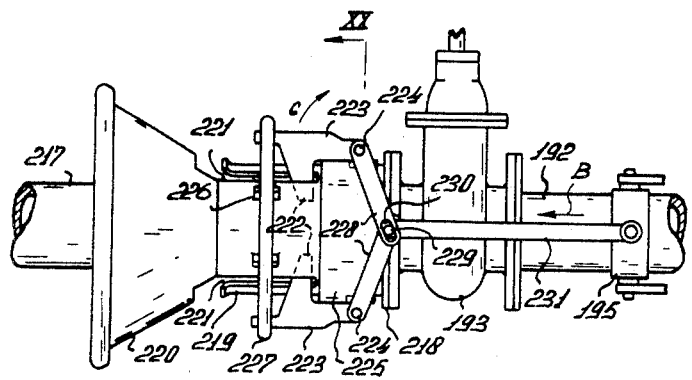
Figure 20:
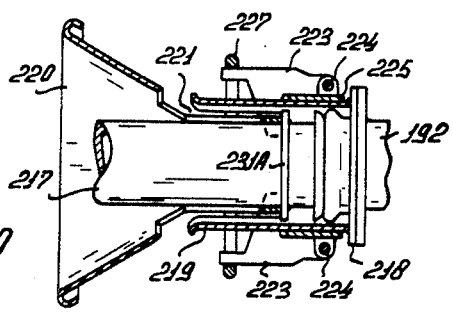
Figure 21:
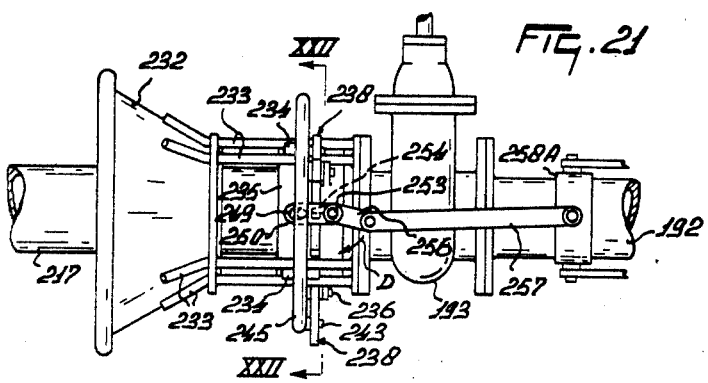

For a better understanding of the invention, and to show how the same may be carried into effect, reference will now be made, by way of example, to the accompanying drawings, in which:

FIGURE 1 is a side elevation of an implement in accordance with the invention,

FIGURE 2 is an elevation, to an enlarged scale, showing a coupling member and associated parts that are visible in FIGURE 1 in greater detail, FIGURE 3 is a section taken on the line III—III of FIGURE 2, FIGURE 4 is a plan view showing certain parts of the implement of FIGURE 1, FIGURE 5 is a view, to an enlarged scale, as seen in the direction indicated by an arrow V in FIGURE 4, FIGURE 6 is a side elevation showing an alternative arrangement of certain of the parts illustrated in FIGURE 1, FIGURE 7 is a side elevation of a rear region of a second form of implement in accordance with the invention, FIGURE 8 is a rear elevation corresponding to FIGURE 7, FIGURE 9 corresponds to FIGURES 1 and 7 and shows a third embodiment, FIGURE 10 is a sectional view of a coupling member of the implement of FIGURE 9 in an open or released condition, FIGURE 11 is a side elevation of a further form of implement in accordance with the invention, FIGURE 12 is a view, to an enlarged scale, as seen in the direction indicated by the arrow XII of FIGURE 11, certain parts being omitted, FIGURE 13 is a section taken on the line XIII—XIII of FIGURE 12, FIGURE 14 is a side elevation of a further alternative form of parts of an implement in accordance with the invention, FIGURE 15 is a section taken on the line XV—XV of FIGURE 14, FIGURE 16 is a side elevation of the rear of a further form of implement in accordance with the invention, FIGURE 17 is a section taken on the line XVII—XVII of FIGURE 16, FIGURE 18 corresponds to FIGURE 17 but shows a duct connected to the coupling member of the former figure, FIGURE 19 is a side elevation of a further form of coupling member forming part of an implement in accordance with the invention, FIGURE 20 is a sectional elevation of certain of the parts that can be seen in FIGURE 19, FIGURE 21 is a side elevation of a further coupling member forming part of an implement in accordance with the invention, FIGURE 22 is a section taken on the line XXII—XXII of FIGURE 21, FIGURE 23 is a section taken on the line XXIII—XXIII of FIGURE 22.

FIGURE 24 is a part-sectional side elevation of a still further coupling member forming part of an implement in accordance with the invention, and FIGURE 25 is diagrammatically a further embodiment of an implement for the transport of material, which implement is provided with a construction according to the invention.

Referring to FIGURES 1 to 5 of the drawings, the agricultural implement for transporting material which is illustrated is intended for agricultural purposes such as the extraction of semi-liquid manures and sludges from settling tanks, pits and the like and the subsequent transport thereof to a field or other plot of land over which the fertilising semi-liquid is then spread. The implement has a frame 1 which is supported, towards its rear, by a pair of ground wheels 2 and, towards its front, by a single smaller caster ground wheel 3 the level of the axle of which can be raised or lowered relative to the frame in known manner. The caster ground wheel 3 is arranged beneath a draw-bar 4 by which the implement can be placed in towed connection with a tractor or other vehicle. The frame 1 supports a container in the form of a generally cylindrical tank 5 the leading end of which communicates with a double acting pump 7 by way of a pipe 6. The pump 7 is arranged in front of the tank 5 and, as can be seen in outline in FIGURE 1 of the drawings, it is arranged to be driven from the power take-off shaft of the same tractor or other vehicle which tows the implement through the intermediary of a separate transmission shaft provided with universal joints at its opposite ends. An outlet port 8 is provided at the rear of the tank 5 and leads to a spreading member 9 adapted to produce a fan-shaped curtain of fertiliser or other liquid or semi-liquid material during a spreading operation of the implement. The outlet port 8 includes a closing member in the form of a shut-off valve 10 that is arranged to be opened and closed by a lever 11A mounted at the front of the implement through the intermediary of a system of pivotally interconnected rods and levers 11 that are arranged in a conventional manner.

An inlet port 12 is arranged at one side of the tank 5 approximately midway between the top and bottom of the latter and at a location above, and in approximate vertical register with, the longitudinal axis of the axle of the two ground wheels 2. The inlet port 12 communicates by way of a rearwardly and downwardly extending flexible pipe 13 with a rigid pipe 14 whose rearmost and lowermost end is provided with a coupling member 15.

The coupling member 15 is shown in greater detail in FIGURES 2 and 3 of the drawings and includes a support ring 17 which surrounds the pipe 14 a short distance towards the flexible pipe 13 from an end sleeve 16 which gives said pipe 14 a thickened flange-like mouth. Pairs of lugs 18 project upwardly and downwardly from upper and lower regions of the ring 17 with the two lugs 18 in each pair spaced apart horizontally from one another. Each pair of lugs 18 pivotally supports a corresponding shaft 19, the two shafts 19 extending parallel to one another and each of them carrying a corresponding centrally mounted hook 20 in such a way that the two hooks 20 are spaced apart from one another by 80° about the longitudinal axis of the rigid pipe 14. The ends of the shafts 19 that project beyond the lugs 18 are rigidly secured to arms 21 which, as can be seen in FIGURE 3 of the drawings, extend around the outer curved surface of the pipe 14 to have their opposite ends arranged in overlapping relationship approximately midway between the two shafts 19. The overlapping ends of the arms 21 are formed with slots 22 through which corresponding pivot pins 23, that extend parallel to the shafts 19, are entered. The pivot pins 23 are carried at the ends of arms 24 that extend substantially parallel to the length of the rigid pipe 14.

The ends of the arms 24 that are remote from the pins 23 are connected by further relatively parallel pins 25 to the ends of the limbs 26 of a lever-bracket 27 whose fulcrum is afforded by a pin 29 carried by lugs secured to the rigid pipe 14. A pair of lugs 30 project upwardly from the crossbar of the lever-bracket 27 and one end of a hydraulic piston and cylinder assembly 31 is pivotally mounted therebetween. The opposite end of the adjusting assembly 31 which has just been mentioned is pivotally connected to a pair of lugs 32 that are rigidly secured to the pipe 14. At least one helical tension spring 33 extends between the two pivots that lie at opposite ends of the assembly 31, said spring(s) 33 tending to maintain the assembly 31 in the position that is illustrated in the drawings in which the piston is fully retracted into the cylinder. It will be seen from the drawings that the or each spring 33 extends substantially longitudinally parallel to the assembly 31.

It can be seen from FIGURES 1, 4 and 5 of the drawings that a support 34 projects from the side of the tank 5 towards the leading end thereof and that a further support 35 projects outwardly from the tank 5 adjacent its rear end, the two supports 34 and 35 being located at the same level when the longitudinal axis of the tank 5 is substantially horizontally disposed. The free ends of the two supports 34 and 35 carry vertical bearings 36 in which vertical shafts 37 are turnably mounted. The upper end of each shaft 37 has the base of a U-shaped bracket 38 fastened to it and an arm 41 projects forwardly of the implement from the leading one of the two brackets 38, said arm 41 being connected to that bracket 38 by having a substantially horizontal bearing 40 which it carries entered between the two limbs of the bracket and pivotally connected thereto with the aid of a substantially horizontal pin 39. Two relatively spaced but parallel strips 42 project upwardly from the bearing 40 and, together with the arm 41, afford a rocker 41A that is turnable about the horizontal axis of the pin 39 and also about the vertical axis of the pin 37. The rocker 41A thus has two arms, that is to say, the arm 41 and a second arm afforded by the two strips 42.

A substantially horizontal arm 43 projects from the bracket 38 towards the tank 5 and a substantially horizontal bearing 44 is arranged between the limbs of the rearmost bracket 38 with the aid of a further pin 39. The bearing 44 forms part of a second rocker 45 which also includes an upwardly projecting arm 46 (FIGURE 4) and a rearwardly projecting arm 47 (FIGURE 4) that is afforded by two strips. The second rocker 45 is also turnable about a horizontal axis and a vertical axis. The upper end of the arm 46 is pivotally connected by a rod 48 to the upper end of the arm of the first rocker 41A which is afforded by the two strips 42. A substantially horizontal arm 49 projects from the rear bracket 38 towards the tank 5, this arm 49 being shorter than the previously mentioned arm 43 and the ends of the two arms 49 and 43 that are remote from the corresponding brackets 38 being pivotally interconnected by a rod 50. The free end of the arm 47 has a horizontal sleeve 52 pivotally mounted between the two strips which afford that arm by means of a horizontal pin 51. One end of a chain 53 (FIGURE 1) is connected to the sleeve 52, the opposite and lower end of said chain 53 being connected to a lug 54 (FIGURE 2) that is secured to the rigid pipe 14 near the pivot pin 29. The inlet port 12 can be closed inside the tank 5 by a closure member 55 which is mounted on a substantially vertical shaft 56. The shaft 56 is pivotable to move the closure member 55 between operative and inoperative positions with the aid of a hydraulic piston and cylinder assembly 57 mounted on the external surface of the tank 5.

FIGURES 1 and 2 of the drawings show a support 58 for a suction duct 59 through which liquid or semi-liquid material is withdrawn from a pit, tank or other container when filling the tank 5. The upper end of the suction duct 59 is connected to a rigid pipe 60 which includes two portions whose longitudinal axes are inclined to one another at an angle of about 30°. The end of the pipe 60 that is remote from the duct 59 is provided with a connecting sleeve 61. The support 58 includes a forked cradle 62 for the rigid pipe 60, the cradle 62 being displaceable upwardly and downwardly in a sleeve 63 that is carried at the junction between two beams 64 arranged in inverted V-shaped relationship. The lowermost ends of the beams 64 are connected to two feet 64A that diverge relative to one another away from the beams 64. It will be evident from the drawings that a plane containing the longitudinal axes of the beams 64 is inclined to a plane containing the longitudinal axes of the feet 64A at an angle of about 70°. Instead of employing the support 58 in the manner which can be seen in FIGURES 1 and 2 of the drawings, said support may be used in the manner which can be seen in FIGURE 6 of the drawings in which the beams 64 are hung on a wall or the like, the cradle 62 being entered in the opposite end of the sleeve 63 as compared with FIGURES 1 and 2 of the drawings so that the forked part thereof lies between the beams 64.

In the use of the implement which has been described in withdrawing liquid or semi-liquid material from a settling pit, tank or the like, the suction duct 59 is introduced into said pit, tank or the like with the rigid pipe 60 at the upper end thereof supported in the cradle 62. The implement is then maneuvered rearwardly toward the support 58 until the end sleeve 16 of the pipe 14 and the sleeve 61 on the pipe 60 are in close proximity to one another. The arm 41 is then employed to turn the interconnected rockers 41A and 45 about the corresponding pairs of horizontal and vertical axes to move the arm 47, which supports the rigid pipe 14 by way of the chain 53, as may be required to bring the sleeves 16 and 61 into general alignment. It will be noted that the greater length of the arm 43, as compared with the arm 49, means that a given angular displacement of the arm 41 produces an angular displacement of the arm 47 which is similar, but of reduced extent. Furthermore, it will be remembered that the rigid pipe 14 can move upwardly, downwardly and laterally relative to the tank 5 in response to displacement of the chain 53 due to its connection to the inlet port 12 by way of the flexible pipe 13.

As soon as the rigid pipe 14 has been maneuvered into general alignment with the pipe 60, a hydraulic circuit is actuated to extend the piston of the hydraulic piston and cylinder assembly 31. The lever-bracket 27 thus turns about the pivot pin 29 in an anti-clockwise direction as seen in FIGURE 2 of the drawings thus moving the arms 24 in a direction generally parallel to the direction indicated by an arrow A in FIGURE 2. It is noted that, although the ring 17 slidably surrounds the pipe 14, there is an appreciable frictional resistance to such sliding movement so that the arms 24 will turn the arms 21 and hooks 20 about the axes of the shafts 19 before the ring 17 will slide axially of the pipe 14. It will be evident from the drawings that the pivotal movement which has just been mentioned brings the extremities of the hooks 20 behind a flange of the sleeve 61 after which further movement of the arms 24 in the direction A entrains the ring 17 so that the latter also moves in the direction A. This movement continues until the hooks 20 have drawn the sleeve 61 into tight engagement with the end sleeve 16 of the pipe 14. Upon moving the closure member 55 to an open position with the aid of the hydraulic piston and cylinder assembly 57, the tank 5 can be filled by suction employing the double-acting pump 7 in a conventional manner. As soon as the tank 5 is completely filled, or is filled to a desired extent, the closure member 55 is returned to its operative closing position and the oil or other hydraulic pressure medium in the cylinder of the assembly 31 is allowed to drain back to the reservoir of the hydraulic circuit. The or each tension spring 33 then acts to retract the piston of the assembly 31 back into the cylinder thus disengaging the hooks 20 from the sleeve 61 and moving the ring 17 back toward the sleeve 16 in a direction opposite to the direction A. The implement can then be towed to a field or other site at which the contents of the tank 5 are to be spread, the spreading operation being performed in a conventional manner with the aid of the double-acting pump 7 and the spreading member 9. Instead of operating the coupling member 15 hydraulically, it will be apparent that it could equally well be operated pneumatically by the pump 7 or in any convenient mechanical way.

FIGURES 7 and 8 of the drawings illustrate an alternative construction of certain parts in which an inlet port 65 is arranged at one side of the bottom of the tank 5 to the rear of the ground wheels 2. The inlet port 65 is provided with a closure member 67, in the form of a shut-off valve, said closure member 67 being arranged to be placed in an open or closed condition through the intermediary of a generally known rod and lever system 66 which can be operated from the front of the implement. The inlet port 65 leads, by way of the closure member 67, to a rigid pipe 68 that carries a coupling member 15 identical to that which has already been described. However, in this case, a guide or capturing basket 69 is secured to the pipe 68 and, as will be evident from the drawings, acts to guide the sleeve 61 into approximate alignment with the sleeve 16 at the rear end of the pipe 68.

Horizontal lugs 72 project rearwardly from the rear end of the tank 5 and a substantially vertical shaft 70 is supported thereby. A sleeve 71 is turnable around the shaft 70 and carries a projecting arm 73 the opposite end of which is connected to a spreading member 74. The spreading member 74 is provided, in known manner, with a connecting sleeve 75 at one end and with a distributing plate 76 at the opposite end. The upper end of the shaft 70 carries a projecting arm 77 which is coupled by a connecting rod 78 to a rocker 79 pivotable about a support carried by the tank 5. A connecting rod 80 links one arm of the rocker 79 and an operating lever mounted at the front of the implement.

Filling of the tank 5 in the embodiment of FIGURES 7 and 8 of the drawings is accomplished in substantially the same manner that has already been described except that the guide or capturing basket 69 assists in positioning the sleeve 61 correctly in relation to the end of the pipe 68. As soon as the connection has been established, the closure member 67 is opened to allow the pump 7 to fill the tank 5. After the tank has been filled and the closure member 67 has been shut, the implement can be towed to a field or other spreading site at which the driver of the towing tractor or other vehicle turns the spreading member 74 about the axis of the shaft 70, with the aid of the parts 77 to 80, until the connecting sleeve 75 is close to the end of the pipe 68. The coupling member 15 can then be operated once again to connect the sleeve 75 tightly to the sleeve 16 whereafter the pump 7 is employed to feed the material in the tank 5 to the spreading member 74 by way of the inlet port 65 which, it will be realised, then functions as an outlet port.

In the embodiment illustrated in FIGURES 9 and 10 of the drawings, the ring 17 is replaced by a ring 81 which once again, is slidable along the rigid tube 68 upon which it is mounted. The ring 81 is provided, towards one of its ends, with a number of pairs of lugs 82, said pairs of lugs being spaced apart from one another at regular intervals around the longitudinal axis of the ring. The pairs of lugs 82, of which there may conveniently be four, have pairs of links 84 pivotally mounted between them with the aid of pins 83 and each pair of relatively spaced links 84 has a corresponding hook 86 pivotally mounted between them with the aid of a pin 85 which is spaced from, but parallel to, the corresponding pin 83. The rearmost end of each hook 86, in addition to having a portion adapted to make contact with a sleeve 61 or the like, carries a curved grip 86A. The leading end of each hook 86 is provided, adjacent the corresponding pin 85, with a hook-like projection 87, all the projections 87 being arranged to co-operate with a stop 88 that surrounds the pipe 68 and that is rigidly connected thereto by supports 89. The ring 81 is provided with diametrically opposed trunnion pins 90 and arms 91 are turnable thereabout, the ends of the arms 91 that are remote from the pins 90 being pivotally connected to the lowermost ends of the limbs 92 of a lever-bracket 93. The lever-bracket 93 is pivotally connected by a pin 94 to a bracket 95 which projects from the tank 5 above the pipe 68. A lug 96 projects upwardly from the lever-bracket 93 above the pivot pin 94 and its uppermost end is pivotally connected by a pin 97 to a fork at the end of the piston rod of a hydraulic double-acting piston and cylinder assembly 98, the cylinder of said assembly 98 being pivotally connected to a further bracket carried by the tank 5.

A bracket 99 projects rearwardly from the rear end of the tank 5 and supports a substantially horizontal shaft 100 about the axis of which a rocker 101 is turnable. One arm of the rocker 101 carries a spreading member 102 provided at one end with a distributing plate 104 and at the other end with a connecting sleeve 103 adapted to co-operate with the sleeve 16 at the rear end of the pipe 68. The mouth of the spreading member 102 which is located alongside the distributing plate 104 is provided with a closing plate 105 that is pivotally connected to an arm 106. The arm 106 is, in turn, pivotally connected to an arm 107 one end of which is itself pivotally connected to that arm of the rocker 101 which supports the spreading member 102. A helical tension spring 108 is interposed between the arm 107 and a bracket carried by the spreading member 102 and tends to turn the arm 107 in an anti-clockwise direction, as seen in FIGURE 9 of the drawings, about its pivotal connection with the rocker 101 to an extent dictated by the setting of a stop 109 whose position is dictated by the setting of an adjusting device 110 connected to the rocker 101. It will be apparent that the position of the closing plate 105 is dependent upon that of the arm 107 relative the rocker 101, this position, in turn, being dependent upon that of the stop 109. The adjusting device 110 thus dictates the cross-sectional area of the mouth of the spreading member 102 which will normally be opened by the plate 105. The end of the arm 107 that is remote from the rocker 101 carries a pulley 111 around which a rope or cable 112 is passed, one end of said rope or cable 112 being anchored directly or indirectly to the bracket 99. The rope or cable 112 passes through an eye on a support 113 connected to the shaft 100 and forwardly therefrom to the front of the implement where it can be operated by the driver of the tractor or other vehicle to which the implement is connected in the use thereof. The second and shorter arm of the rocker 101 is pivotally coupled to the rear end of a connecting rod 114 which also extends forwardly of the implement to a location at which it can be moved by the driver of the tractor or other vehicle which has just been mentioned.

In the use of the implement which has been described with reference to FIGURES 9 and 10 of the drawings, the tank 5 is filled in a manner similar to that previously described, tight engagement of the sleeve 61 with the end sleeve 16 being effected by extending the piston rod of the assembly 98 to move the ring 81 lengthwise of the pipe 68 to bring the shanks of the hooks 86 into engagement with the inner surface of the stop 88 thus centering the pipe 60 by means of the grips 86A and drawing the sleeve 61 tightly into engagement with the end sleeve 16 by way of the extremities of the hooks 86 assisted by the grips 86A. When disconnection of the coupling member is required, the piston rod of the assembly 98 is retracted so that the ring 81 is moved lengthwise of the pipe 68 in the opposite direction until the projections 87 make hooking engagement with the stop 88 at which time the hooks 86 are turned about the pins 83 and 85 until they reach the position shown in FIGURE 10 of the drawings which is such that the grips 6A are well clear of the pipe 60. It will be noted at this point that the section of FIGURE 10 is turned through 45° about the axis of the pipe 68 as compared with the plane of FIGURE 9. The pump 7 and the closure member 67 are, of course, operated appropriately during filling of the tank 5. After a filling operation, the remote-controlled coupling member is operated to disconnect the pipe 68 from the pipe 60 and the implement is then towed to a field or other spreading site whereupon the connecting rod 114 is moved rearwardly to turn the spreading member 102 downwardly about the shaft 100 until its connecting sleeve 103 is in alignment with the end sleeve 16 of the pipe 68. The coupling member is then operated to produce a tight connection between the sleeve 103 and the end sleeve 16. The adjusting device 110 will be set to open the mouth of the spreading member 102 to a desired extent and the closure member 67 can then be opened and the pump 7 operated to spread the material over the ground. In the event of the spreading member 102 becoming clogged, the rope or cable 112 can be pulled to fully open the mouth of said spreading member by moving the closing plate 105 against the action of the spring 108. As soon as the pull on the rope or cable 112 is released, the closing plate 105 moves back to the setting dictated by the device 110. It will be apparent that, if desired, the remote-controlled coupling member can be employed to connect a delivery duct to the pipe 68 instead of the spreading member 102, the delivery duct leading, for example, to a store or opening direct onto the ground.

The spreading implement which is illustrated in FIGURES 11 to 13 of the drawings is particularly suitable for use with thick semi-liquid materials such as mixtures of farmyard manure, slush and the like and comprises a mobile frame 121 that is supported towards the rear by a pair of ground wheels 122 and at the front by a castor ground wheel 123 whose mounting is connected to a draw bar 124 in such a way that the level of the axle of the ground wheel 123 can be adjusted vertically relative to that of the frame 121. The frame 121 supports a container in the form of a tank 125, the leading end of said tank 125 communicating by way of a duct 126 with a double-acting pump 127, the pump 127 being mounted on the frame 121 a short distance in front of the tank 125. The pump 127 is arranged so that it can be driven from the power take-off shaft of a tractor or other vehicle to which the draw bar 124 will be connected during the use of the implement. The rear of the tank 125 is provided with an outlet port 128 that leads to a spreading member 129. The outlet port 128 is provided with a closure member 130 in the form of a shut-off valve and it will be seen from FIGURE 11 of the drawings that this valve can be operated in a conventional manner by a control lever 119 through the intermediary of an assembly 131 of pivotally interconnected rods and levers.

An inlet port 123A is provided at the front end of the tank 125 and communicates by way of a closure member 133 in the form of a shut-off valve with a suction pipe or duct 132 (FIGURE 12). The end of the pipe 132 which joins the closure member 133 is connected thereto so as to be turnable about an approximately horizontal axis more or less corresponding with the longitudinal axis of the tank 125. Said end of the pipe 132 carries an arm 134 which is pivotally connected by a pin 135 to the lowermost end of a piston rod 136 which projects from a hydraulic cylinder 137 which, in turn, is pivotally connected by a pin 138 to a bracket 139 that projects forwardly from the tank 125. The closure member 133 is moved between an open and a closed condition with the aid of a control lever 140 that projects forwardly of the implement to a position at which it can be operated by the driver of an agricultural tractor to which the draw bar 124 will be connected in the use of the implement. The same is, of course, true of the control lever 119.

The pipe 132 has a downwardly projecting end that is formed with a hollow rim 141, the recess of said rim accommodating a rubber or other similar ring. A ring 142 surrounds the exterior of the downwardly projecting end of the pipe 132 above the rim 141, said ring being provided with oppositely directed pairs of relatively spaced lugs 143. An assembly of two shafts 144, two hooks 145, four arms 146, two pivot pins 147 and two arms 148 which carry said pins 147 is provided, this assembly being substantially identical in construction and operation to the assembly of parts 18 to 24 which has previously been described with particular reference to FIGURES 2 and 3 of the drawings. It will, of course, be noted that the ends of the arms 146 are formed with slots, similar to the previously described slots 22, through which the aligned pivot pins 147 are entered. The arms 148 extend approximately vertically lengthwise of the lower end of the pipe 132 and their upper ends are pivotally connected by pins 149 to the free ends of the two limbs of a lever-bracket 150 which is turnably connected by a pivot pin 151 to a support 152 rigid with the pipe 132. A lug 120 projects from the crossbar of the lever-bracket 150 and the piston rod 153 of a hydraulic piston and cylinder assembly 154 is pivotally connected thereto, the cylinder of said assembly 154 being itself pivotally connected to a support 155 rigid with the pipe 132. A duct 156 for oil or other hydraulic pressure medium communicates with the cylinder of the assembly 154 and at least one helical tension spring 157 extends between the lug 120 and the support 155, the or each tension spring 157 tending to retain the assembly 154 in the position which can be seen in FIGURE 12 of the drawings in which its piston rod 153 is substantially fully retracted into the cylinder. The or each tension spring 157 is arranged so that it extends substantially parallel to the length of the assembly 154. Rings 158 are secured to the pipe 132 above the movable ring 142 and arms 159 project downwardly therefrom to a level beneath that of the rim 141. A guide or capturing basket 160 taking the form of an assembly of rigidly interconnected rods or bars is secured to the lowermost ends of the arms 159, the assembly being of approximately frusto-conical configuration and being arranged so that it tapers upwardly towards the rim 141 of the pipe 132, the axis of the frusto-conical figure substantially coinciding with the longitudinal axis of the pipe 132.

A settling pit, settling tank or other store 161 (FIGURE 11) has an opening 162 through which a rigid pipe 163 is entered. A support plate 164 is secured to the pipe 163 adjacent the upper end thereof and bears upon the ground surface around the margins of the opening 162. A flexible duct 165 connects the uppermost end of the pipe 163 with a rigid pipe or duct 166 (FIGURE 12) whose uppermost end carries a connecting sleeve 167 that is adapted to make tight sealing engagement with the rim 141 of the pipe 132 which rim, it will be remembered, is provided with a rubber or other sealing ring that is not visible in the drawings.

The suction pipe or duct 132 can readily be coupled to the rigid delivery pipe or duct 166 by remote control from the driving seat of the tractor or other vehicle to which the draw bar 124 is connected in the use of the implement. The fact that the pipe or duct 132 is located at the leading end of the implement considerably facilitates this since the driver can thus closely watch the operation which he is controlling. The pipe 132 is first lifted with the aid of the hydraulic cylinder 137 to a position in which the guide or capturing basket 160 is above the level of the sleeve 167. When these two parts are in approximate vertical alignment, the pipe 132 is allowed to move downwardly again so that the sleeve 167 is guided into register with the rim 141, the flexible duct 165 providing for any lateral movement of the pipe 166 which is required. As soon as the sleeve 167 and rim 141 are in approximately the correct relative positions, the piston rod 153 of the assembly 154 can be extended to move the arms 148, and subsequently the ring 142, upwardly along the pipe 132 to close the hooks 145 around a flange of the sleeve 167 and pull said flange into sealing engagement with the rim 141. The pipe 166 will then be substantially rigidly connected to the pipe 132.

Upon operating the pump 127 to withdraw air from the tank 125, the material in the pit, tank or other store 161 will be sucked into the tank 125 as soon as the closure member 133 is opened. In order to facilitate the filling of the tank 125 with very thick semi-liquids, the diameters of the various pipes and ducts 163, 165, 166 and 132 are preferably not less than 6 inches and, in the embodiment which is being described, said diameters are about 8 inches so that, generally speaking, little difficulty is employed in collecting and transporting thick semi-liquid materials which contain lumps of solid impurities. After the tank 125 has been filled to the desired extent, the closure member 133 is shut and the duct 156 is connected to the oil or other hydraulic pressure medium reservoir. The or each spring 157 is then able to return the various movable parts to approximately the settings illustrated in FIGURE 12 of the drawings in which the hooks 145 are no longer in engagement with the sleeve 167. The implement can then be towed to the field or other site at which the material in the tank 125 is to be spread. If desired, the implement which has just been described may be provided with a pipe or duct arranged to feed air under pressure to an air distribution system contained inside the pit, tank or other store 161. This pipe or duct will preferably be of smaller diameter than the pipe or duct 132 and is preferably provided with closure members and coupling members that are similar to those which have already been described. The suction pipe or duct 132 and the air supply pipe or duct can then conveniently be connected to the co-operating pipes or ducts in a single operation.

Figures 14, 15:
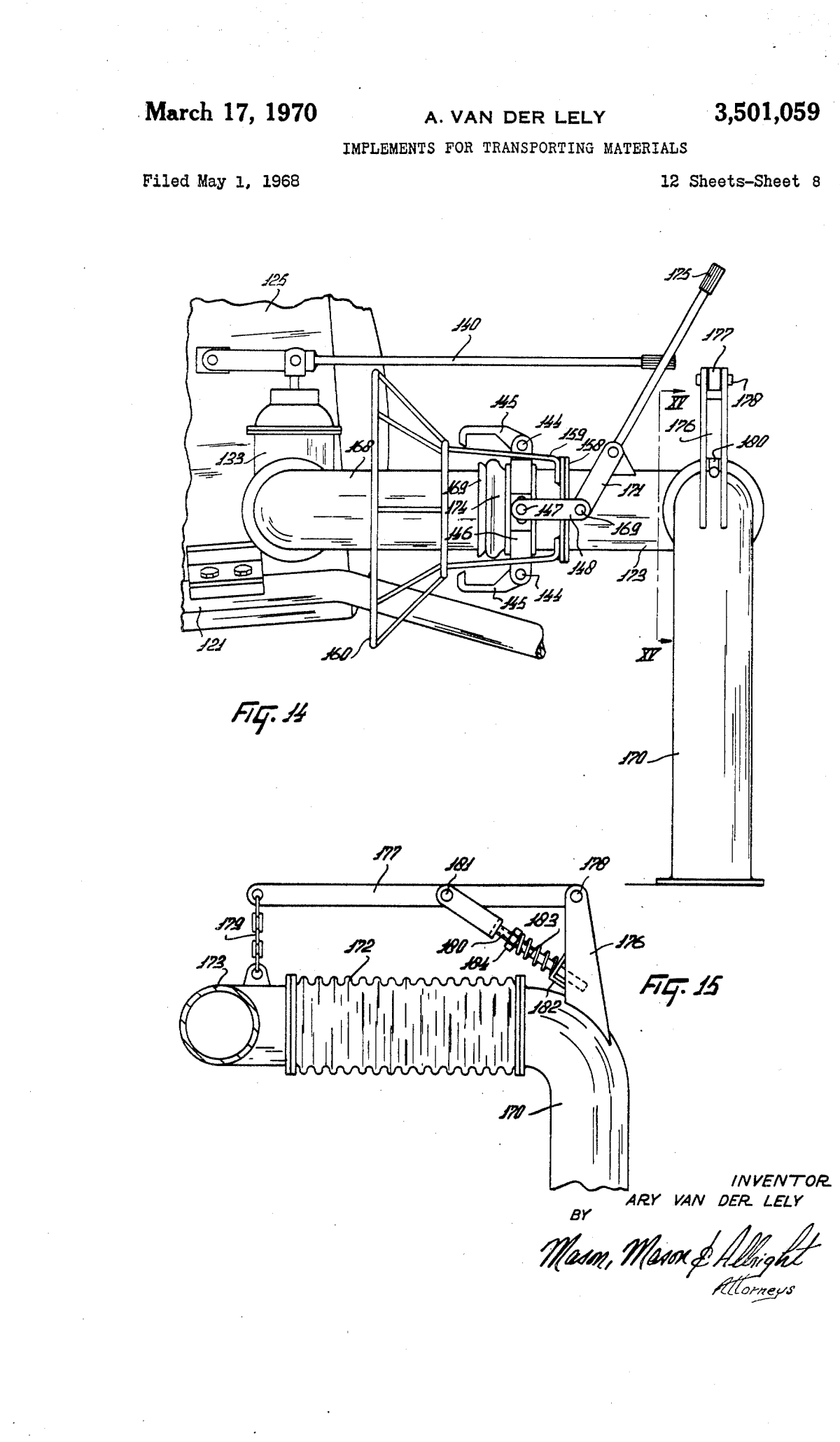

FIGURES 14 and 15 of the drawings illustrate a modification in which the inlet port is provide at one side of the tank 125, said inlet port having an extension 168 which projects forwardly from the closure member 133 in a direction approximately parallel to the longitudinal axis of the tank 125. The leading end of the extension 168 has a connecting sleeve 169 of similar construction to the connecting sleeve 167. A vertical pipe or duct 170 leads from the pit, tank or other store 161, its upper end being bent-over and connected to one end of a horizontally extending flexible pipe 172. The opposite end of the flexible pipe 172 is connected to one end of a horizontally disposed L-shaped pipe or duct 173 the opposite end of which has a hollow rim 174 of substantially identical construction to the previously described rim 141. The end of the pipe or duct 173 which faces the sleeve 169 is also provided with a remote-controlled coupling member and guide or capturing basket 160 that are substantially identical in construction to parts that are illustrated in FIGURES 12 and 13 of the drawings. However, in this case, the arms 148 are connected to a lever-bracket 171 that is turnable about a pivot with the aid of a hand-lever 175 instead of the hydraulic piston and cylinder assembly 154.

A forked supporting bracket 176 is mounted at the upper end of the vertical portion of the pipe 170 and one end of an arm 177 is turnably connected to said bracket 176 with the aid of a substantially horizontal pivot pin 178. The arm 177 extends above the flexible pipe 172 towards the rigid L-shaped pipe 173 and the end of said arm that is remote from the pin 178 supports the pipe 173 by way of a chain 179. One end of a rod 180 is pivotally connected to the arm 177 by means of a pin 181 at a distance from the pin 178. The rod 180 is entered through a hole in a plate 182 carried by the support 176 and a helical compression spring 183 surrounds said rod 180 between the plate 182 and a nut 184 mounted on a screw-threaded portion of the rod. It will be apparent that the position of the arm 177 which supports the pipe 173 about the pin 178 is determined principally by the setting of the nut 184 axially of the screw-threaded portion of the rod 180. Moving the nut towards the pin 181 causes the arm 177 to turn downwardly about the pin 178 whereas moving the nut further away from the pin 181 causes the arm 177 to turn upwardly about the pin 178.

Once again, coupling of the extension 168 of the inlet duct to the pipe or duct 173 is accomplished in a simple manner. The implement is maneuvered forwardly until the sleeve 169 arrives in approximate register with the rim 174. This is accomplished without difficulty since the extension 168 is at the front of the implement and thus within view of the driver of the tractor or other towing vehicle. The levers 140 and 175 are both within reach of the driver of the tractor or other vehicle and he is thus able to move them to operate the coupling member and the closure member 133 when required. Once again, if desired, a pipe or duct for the supply of air under pressure to the interior of a pit, tank or other store may be provided on the implement to cause homogenization of a liquid having thicker and thinner constituents immediately prior to, and during, filling of the tank 125. Once again, a coupling member similar to that which has been described is preferably provided for the air pipe or duct so that the necessary connection can be established quickly and without difficulty.

FIGURES 16 to 18 of the drawings show a construction in which a container in the form of a tank 191 has an inlet port 192 which opens at one side of the tank and then extends rearwardly of the tank in a direction substantially parallel to the longitudinal axis of the tank. Once again, the inlet port 192 is provided with a closure member 193 in the form of a shut-off valve which is arranged to be operated by a control lever at the leading end of the implement through the intermediary of an assembly 194 of pivotally interconnected rods and levers. A ring 195 surrounds the inlet port 192 between the closure member 193 and the connection of said port to the tank 191, the ring 195 being slidable axially of the port 192. Pairs of lugs 196 project from opposite sides of the ring and pins 197 which are supported by said lugs act as the pivots for two hooks that form parts of a coupling member 198. Each hook extends past the closure member 193 and beyond the mouth of the inlet port 192 and is provided, towards its hooking extremity, with a portion 199 which carries a curved sleeve section 200 or 201 respectively. Each curved sleeve section 200 and 201 has two pairs of projecting rods 202 secured to it in such a way that said rods, which extend in more or less opposite directions, have their free ends disposed in overlapping relationship even when, as in FIGURE 17 of the drawings, the coupling member 198 is in a released or open condition. Supports 203 project from opposite sides of the mouth of the inlet port 192 and the two hooks of the coupling member 198 are entered through the respective slots so as to be supported by the edges thereof.

It can be seen from FIGURES 17 and 18 of the drawings that a ring 205 surrounds the inlet port 192 at the side of the closure member 193 remote from the slotted supports 203, said ring 205 being connected to the tubular nlet port 192 by a number of strips 204. The arrangement is such that the hooks of the coupling member 198 are located inside the ring 105. Each of the hooks which has just been mentioned has an outwardly bent-over portion located adjacent to the lugs 196, said portions being connected by helical tension springs 206 to anchorages 207 carried by the slidable ring 195. It will be apparent that the helical tension springs 206 could easily be replaced by compression springs interposed between extensions of the ring 195 and portions of the hooks located towards the closure member 193 from the pins 197. The ring 195 is provided with upper and lower trunnion pins 210 and these are pivotally engaged with the ends of arms 209 whose opposite ends are pivotally connected by pins 210 to levers 211 and 212 respectively. The levers 211 and 212 are rigidly secured to a shaft 213 which is journalled in a vertical bearing 214 fastened to the tank 191. The lever 211 has an extension which is pivotally connected to the piston rod of a double-acting hydraulic piston and cylinder assembly 215, the cylinder of said assembly being itself pivotally connected by a vertical pin 216 to an anchorage at the side of the tank 191. The cylinder of the assembly 215 is connected by ducts 217A to hydraulic control mechanism located at the front of the implement within reach of the driver of a tractor or other vehicle which tows the implement during the use thereof. It is preferred that oil or other hydraulic pressure medium should be derived from the hydraulic system of the tractor or other vehicle which has just been mentioned and suitable connection ducts may be provided on the implement to this end.

When it is desired to couple a supply duct 217 projecting from a pit, tank or other store, with the inlet port 192, then the implement is pushed slowly rearwards until the end of the duct 217 (which is provided with a connecting sleeve) finds its way between the rods 202 that are carried by the curved sleeve sections 200 and 201. This condition is shown in FIGURE 17 of the drawings. The assembly 215 is then operated to move the ring 195 axially of the inlet port 192 in the direction indicated by the arrow A in FIGURE 17 of the drawings. The hooks of the coupling member 198 are drawn through the ring 205 in the general direction A so that said ring 205, which serves as a stop and a guide, causes the hooks to turn inwardly about the pins 197 against the action of the springs 206. Raised portions 218A of the outer edges of the hooks co-operate with the rings 205 in effecting the movement which has just been described. The rods 202 guide the supply duct or pipe 217 into the correct position for subsequent engagement by the gripping sleeve sections 200 and 201. Substantially the position illustrated in FIGURE 18 has then been reached. It will be noted from FIGURES 17 and 18 that the sleeve section 201 is larger than the sleeve section 200, this improving the gripping effect thereof on the duct 217. Upon further movement of the ring 195 in the direction A, the hooking extremities of the portions 199 engage the rear of the connecting sleeve provided at the end of the duct 217 and pull the latter, with the assistance of the parts 200, 201 and 202, into tight sealing engagement with the mouth of the inlet duct 192 which mouth is located at the rear side of the closure member 193. A substantially rigid sealed connection is thus established through which liquid or semi-liquid materials such as liquid manure can be sucked. The remote-controlled coupling member 198 is disengaged by moving the ring 195 in a direction opposite to the direction A with the aid of the assembly 215, the springs 206 withdrawing the hooks to a position in which the pipe or duct 217 is released.

FIGURES 19 and 20 of the drawings illustrate an alternative construction in which a cylinder 219, formed with a number of slots 221, is secured around the mouth of the inlet port 192 by means of a flange 218. A guide or capturing basket 220 is fastened to the cylinder 219, the slots 221 in said cylinder extending from close to the junction with the guide or basket 220 for some distance towards the flange 218. The ends 222 of two hooks 223 are entered inwardly through the slots 221, the two hooks 223 being pivotally connected by corresponding upper and lower pins 224 to a ring 225 which is slidable axially of the cylinder 219 and thus axially of the tubular inlet port 192. A ring 227 is connected to the cylinder 219 in surrounding relationship by strips 226, the inner surface of the ring 227 being engaged by extensions of the hooks 223. Each of the pins 224 serves also as the fulcrum of a corresponding pair of levers 228, the arms of these levers being disposed at the side of the ring 225 which is visible in FIGURE 19 of the drawings and also at the side thereof which cannot be seen in said figure. The ends of the arms of the upper and lower levers 228 overlap one another in two pairs and are formed with slots 230 through which pins 229 carried at the ends of the arms 231 are entered, the arms 231 extending substantially parallel to the tubular inlet port 192 at opposite sides thereof. It will be seen from FIGURE 19 of the drawings that the ends of the arms 231 that are remote from the pins 229 are pivotally connected to the ring 195 which has already been described with reference to FIGURES 16 and 18 of the drawings.

FIGURES 19 and 20 illustrate the way in which the supply duct or pipe 217 is tightly connected to the inlet port 192 with the aid of the remote-controlled coupling member. Disconnection is accomplished by moving the ring 195 in the direction B shown in FIGURE 19 of the drawings thus sliding the ring 225 and the hooks 223 which are connected to it in the same direction until the edge of the ring 225 is stopped by the strips 226 at which time the hooks 223 will have passed so far through the ring 227 that they can be turned outwardly in the direction C shown in FIGURE 19 of the drawings by the arms 231 which are still moving in the direction B. It will be apparent that the ring 227 prevents the hooks 223 from moving in the direction C until the condition which has just been described is arrived at. The supply duct or pipe 217 can then slip readily out of connection with the inlet port 192 so that the implement can be driven away to perform a spreading operation.

Connection of the duct 217 to the inlet port 192 is carried out by a reversal of the steps which have just been mentioned. The implement is moved rearwardly until the duct 217 is guided into register with the mouth of the inlet port 192 by the guide or capturing basket 220 after which the arms 231 are moved in a direction opposite to the direction B by the ring 195 to turn the hooks 223 back in a direction opposite to the direction C until their ends 222 make gripping engagement with a flange 231A (FIGURE 20) carried by the duct 217 immediately behind its connecting sleeve. Further movement in a direction opposite to the direction B draws the connecting sleeve of the duct 217 into substantially rigid sealing engagement with the mouth of the tubular inlet port 192.

FIGURES 21 to 23 of the drawings illustrate an embodiment in which a guide or capturing basket 232 is secured to a flange of the inlet port 192 by way of pairs of rod-shaped supports 233, the pairs being spaced apart from one another at regular intervals around the longitudinal axis of the inlet port 192. Sliders 234 project from a ring 235 and are entered between the two supports 233 of each pair in such a way that the ring 235 can slide lengthwise of the tubular inlet port 192 but not rotate thereabout to any appreciable extent. The ring 235 carries a shaft 236 adjacent each pair of supports 233 around each of which shafts 236 a corresponding bearing 237 is turnable. Each bearing 237 carries a corresponding rockable hook 238, each hook 238 including an arm 239 which is entered through a corresponding slot 240 in the ring 235, the inner end of the arm having a hooking extremity 241. Each hook 238 has a second outwardly projecting arm 242 which is formed, towards its end, with a slot 244 through which a pin 243 carried by a supporting ring 245 is entered. The ring 245 also carries inwardly projecting lugs 246 at regular intervals around its center, each lug 246 being connected by a corresponding tension spring 247 to a lug carried by a corresponding one of the sliders 234.

Pins 248 that are spaced apart from one another around the center of the ring 245 project inwardly from that ring at relatively opposite sides thereof, the two pins 248 being entered in slots 249 formed in the arms 250 of rockable levers 251 which levers 251 are turnably mounted on shafts 253 carried by the ring 235 with the aid of sleeve bearings 252. The sleeve bearings 252 carry stops 254 and these stops 254 are arranged to co-operate with stops 255 projecting from the ring 235. The rockable levers 251 include further arms 256 the ends of which are pivotally connected to arms 257 disposed at relatively opposite sides of the inlet port 192 and pivotally connected to a ring 258A which is slidable lengthwise of the tubular inlet port 192 in a similar manner to, for example, the previously described ring 195.

The supply duct or pipe 217 is coupled to the inlet port 192 by causing the assembly 215 to move the ring 258A lengthwise of the inlet port 192 towards the guide or capturing basket 232 so that the arms 257 cause the rings 235 and 245 to be moved in the same direction. As soon as the ring 235 is blocked against further movement by the guide or capturing basket 232, the rockable levers 251 are turned about the shafts 253 in the direction indicated by an arrow D in FIGURE 21 of the drawings thus carrying the ring 245 with them in the direction indicated by an arrow E in FIGURE 22 of the drawings against the action of the three springs 247. Turning movement of the ring 245 causes the rockable hooks 238 to be moved to the positions which are shown in broken lines in respect of one of them in FIGURE 22. Upon moving the implement rearwardly, the connecting sleeve at the end of the supply duct or pipe 217 will be guided by the guide or capturing basket 232 into the interior of the ring 235. The ring 258A is then moved back to the position illustrated in FIGURE 21 so that the hooks 238 move into hooking or clamping engagement with the duct or pipe 217 behind the flange of its connecting sleeve under the action of the springs 247. The stops 254 carried by the arms 250 are in engagement with the stops 255 at this time. During the closing stages of the movement of the ring 258A back to the position shown in FIGURE 21 of the drawings, the connecting sleeve of the pipe or duct 217 is drawn in the same direction into tight sealing engagement with the mouth of the inlet port 192. It will be noted that, in this embodiment, the hooking or clamping parts 238 of the remote-controlled coupling member can move both towards, and parallel to, the longitudinal axis of the inlet port 192.

When it is desired to disconnect the supply duct or pipe 217 from the inlet port 192, the ring 258A is moved to cause the ring 245 to turn a short distance in the direction E so that the hooks 238 no longer exert a clamping or hooking action upon the said duct or pipe 217. The pipe or duct 217 is fully released when the ring 235 comes into contact with the guide or capturing basket 232 since the arms 239 of the hooks 238 are then retracted outwardly through the slots 240 whereafter the implement can be moved forwardly to effect complete disengagement with the pipe or duct 217.

FIGURE 24 of the drawings illustrates a modification in which a coupling member for the supply pipe or duct 217 is located between a guide or capturing basket 258 and the closure member 193 of the inlet port 192. The coupling member includes a generally spherical housing 259 which is provided internally with a flexible and elastic annulus 260 the edges of which are sealed to the wall of the housing 259. The space between the housing 259 and the annulus 260 is in communication by way of an opening 261 with a duct 262 which can be placed in communication with either the pressure or the suction side of an air or liquid pump. The guide or capturing basket 258 once again acts to guide the connecting sleeve at the end of the supply pipe or duct 217 into register with the inlet port 192 and into the interior of the annulus 260. The mouth of the inlet duct 192 is also located internally of the annulus 260 either in contact with, or close to, the connecting sleeve of the duct 217 so that as soon as air or a liquid under pressure is supplied to the space between the annulus 260 and the housing 259 by way of the duct 262, a strong connection and fluid-tight seal will be established in substantially the manner which can be seen in FIGURE 24 of the drawings. The coupling can be broken by sucking the air or liquid out of the space between the annulus 260 and the housing 259 so that the annulus will be withdrawn from around the supply duct or pipe 217 after which the latter can move out of the housing 259 without difficulty.

In FIGURE 25 is shown diagrammatically an embodiment of an agricultural implement for loading and discharging material in form of a wagon for loading crop lying on the field. This wagon is on its rear side provided with a part in form of a conveyor 263 having a part 264 and an adjustable part 265. The part 265 which is hydraulically adjustable can by means of one of the couplings described above remote-controlled be coupled to a duct of a blower 266 for bringing the loaded material in a barn or the like.

It is preferred that, in the constructions which have been described with respect to FIGURES 1-24, the various ducts, pipes and ports through which liquid or semi-liquid materials are passed should have a diameter of not less than 6 inches.

Having thus described my invention, what I claim as new and desire to secure by Letters Patent of the United States is:

1. An implement for transporting liquid and semi-liquid materials comprising a frame and a container supported on said frame, said container having a port with a mouth at one end and its opposite end leading into a side of said container intermediate the top and bottom thereof, said port being turnable by actuating means and said actuating means extending forwardly of said container whereby the mouth of said port can be moved into connection with a duct by remote control.

2. An agricultural implement for transporting materials comprising a movable frame and a container supported by the frame, said container having an at least partly substantially horizontally extending port with a movable coupling member, said port being connectable by said coupling member to a duct for the supply and withdrawal of material from said container through said port and said duct, control means mounted adjacent the front of said implement for actuating said coupling member to effect connection between said duct and said port, said control means being operative at a distance remote from said port.

3. An implement as claimed in claim 2, wherein a pivotably mounted spreading member for distributing the contents of said container is mounted on said container, said spreading member being connectable to said port with said coupling member.

4. An implement as claimed in claim 2, wherein said coupling member is supported on said port and includes a plurality of clamping members, the said clamping members being supported on said port and being movable along the longitudinal axis of said port.

5. An implement as claimed in claim 4, wherein said clamping members comprise a number of pivotably mounted arms, each arm being pivotably mounted on a displaceable support on said port, said support surrounding a portion of said port and being movable lengthwise of said portion.

6. An implement as claimed in claim 5, wherein a spring is positioned between at least one of said arms and its support, said spring opposing movement of said arm in at least one direction.

7. An implement as claimed in claim 2, wherein said coupling member includes at least two arms for clamping said port to a duct, each of said arms having a guide to control its movement.

8. An implement as claimed in claim 7, wherein said guide is a ring connected to said port, said guide ring being also a stop for maintaining said arms in a position in which portions thereof extend substantially parallel to the longitudinal axis of said port.

9. An implement as claimed in claim 7, wherein curved sleeve portions are mounted at the ends of said arms furthest from said support for clamping said port to said duct, the said curved sleeve portions having substantially the same radius of curvature as the external surface of said duct.

10. An implement as claimed in claim 9, wherein said sleeve portions carry guiding rods, said guiding rods being elongated whereby the ends thereof remote from said sleeve portions overlap one another when viewed in the direction of the longitudinal axis of said port and when said sleeve portions are located at the maximum distance apart.

11. An implement as claimed in claim 2, wherein said coupling member has at least two arms for clamping said port to a duct, said arms having a pivotable support movable whereby said clamping arms can be moved towards the longitudinal axis of said port, said pivotable support being turnable about an axis which substantially coincides with the longitudinal axis of said port.

12. An implement as claimed in claim 11, wherein the clamping ends of said arms have rockable hooks, the axes about which said rockable hooks are pivotable extending substantially parallel to the longitudinal axis of said port, and said rockable hooks being pivotably mounted on a displaceable ring located adjacent said support, said arms having portions spaced from said support and entered through slots formed in said displaceable ring.

13. An implement as claimed in claim 12, wherein said coupling member has three arms with rockable hooks and the pivotal axes of said rockable hooks on the displaceable ring are spaced apart from one another by angles of about 120° around the center of said ring, said ring having sliding means and being movable lengthwise of said port.

14. An implement as claimed in claim 12, wherein a spring mechanism is positioned to urge said support in one direction, said spring mechanism comprising tension springs extending between said support and said ring.

15. An implement as claimed in claim 12, wherein a rockable lever is pivotally connected to said support to turn same against resilient opposition whereby the movement of said support moves said arms to disengaged positions, said rockable lever being turnable about an axis substantially perpendicularly inclined to the axis about which said support is turnable, and said rockable lever carrying a stop which is urged into engagement with a further stop on said support by spring means, said spring means resiliently opposing the turning movements of said support.

16. An implement as claimed in claim 2, wherein said control means for actuating the coupling member includes a hydraulic piston assembly and the controls for said piston assembly are located remote from said assembly.

17. An implement as claimed in claim 2, wherein said movable coupling member includes a flexible annulus into which a fluid can be introduced under pressure to clamp said duct to said port, said flexible annulus being located in a housing, the said housing being rigid and having an opening communicating with a hydraulic conduit.

18. An implement as claimed in claim 2, wherein said container is wheeled to be movable over the ground and said frame has a hitch member at its front end for attachment to a prime mover, said control means being located at the front end of said frame whereby said coupling member can be actuated from the driving seat of said prime mover.

19. An implement as claimed in claim 2, wherein said port includes a flexible pipe which is displaceable relative to said container.

20. An implement as claimed in claim 2, wherein said port is located at the front of said implement with respect to the direction of operative travel and the mouth of said port is located forwardly of said container.

21. An implement as claimed in claim 2, wherein said port supports a guide which is positioned to assist in bringing said port and said duct into correct register during a coupling operation, at least a part of said guide being located beyond the mouth of said port, said port being of generally conical configuration.

22. An implement as claimed in claim 2, wherein said port is located to the lateral side of said container.

23. An implement as claimed in claim 2, wherein said port can be shut by a closure member located internally of said container, said closure member being turnable about a substantially vertical axis.

24. An agricultural implement for transporting materials comprising a movable frame and a container supported by said frame, said container having an outlet port and a spreader, said spreader being pivotably mounted on said implement, movable operating means connected to said spreader for pivoting and displacing same relative to the mouth of said port, said operating means being mounted on said implement to be actuated from a distance from said spreader whereby the latter can be pivoted and fitted in communication with the mouth of said port.

25. An implement as claimed in claim 24, wherein a coupling member is mounted on said port and said coupling member is connected to said operating means, said coupling member being connectable to a duct and said duct communicating with a supply of material.

26. The implement of claim 24, wherein said operating means comprises a hydraulic system for pivoting said spreader, said spreader being pivotable about a substantially horizontal axis.

References Cited

UNITED STATES PATENTS

| 1,662,820 | 3/1928 | Condupa | 220—86 |
| 2,199,588 | 5/1940 | Cobham et al. | |
| 2,634,927 | 4/1953 | Smith et al. | |
| 2,742,305 | 4/1956 | Converse et al. | 285—97 X |
| 2,948,306 | 8/1960 | Kuraeff | 141—388 |
| 3,023,030 | 2/1962 | Torres. | |
| 3,199,553 | 10/1965 | Garrett et al. | |
| 3,249,013 | 5/1966 | Pride et al. | |

FOREIGN PATENTS

| 722,617 | 1/1955 | Great Britain. |
| 744,780 | 2/1956 | Great Britain. |
| 854,763 | 11/1960 | Great Britain. |

SAMUEL F. COLEMAN, Primary Examiner

H. S. LANE, Assistant Examiner

U.S. Cl. X.R.

141—388; 285—97